Figure 1:
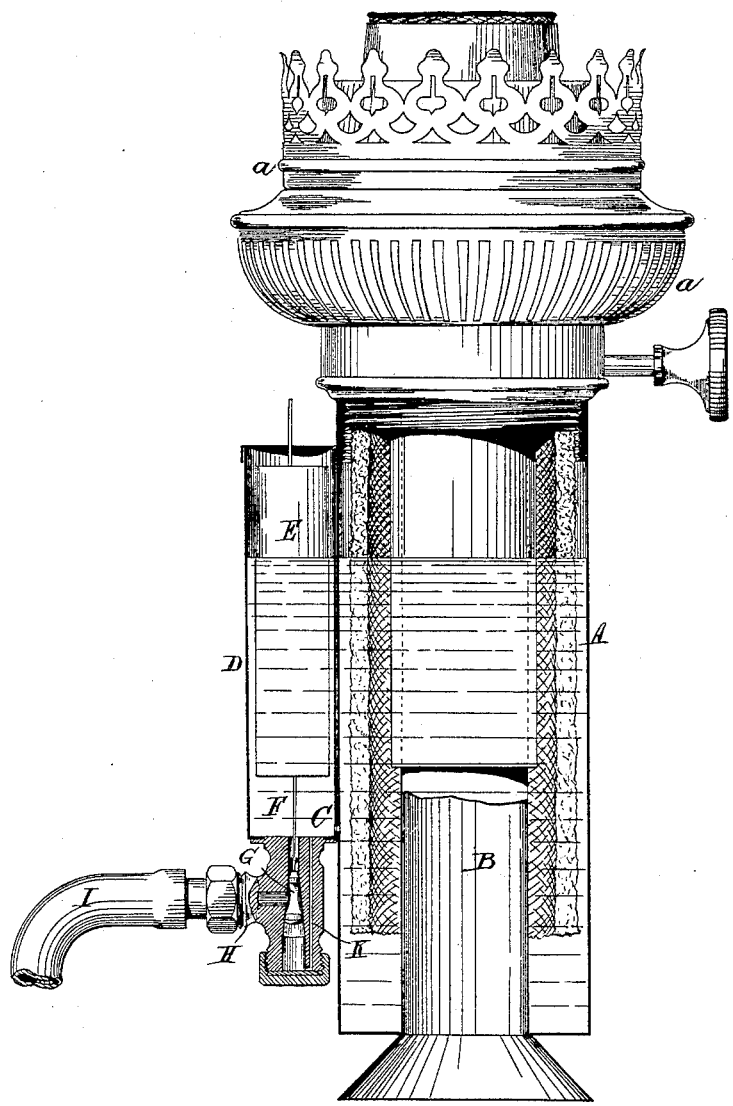

(No Model.) 6 Sheets—Sheet 1.
T. & A. E. PENN.
DEVICE FOR CONTROLLING THE DISTRIBUTION OF OILS TO LAMPS AND MEANS OF LIGHTING AND EXTINGUISHING THE SAME.

No. 477,150. Patented June 14, 1892.

Witnesses:
Inventors:

(No Model.) 6 Sheets—Sheet 2.
T. & A. E. PENN.
DEVICE FOR CONTROLLING THE DISTRIBUTION OF OILS TO LAMPS AND MEANS OF LIGHTING AND EXTINGUISHING THE SAME.

No. 477,150. Patented June 14, 1892.

Witnesses:

Inventors:

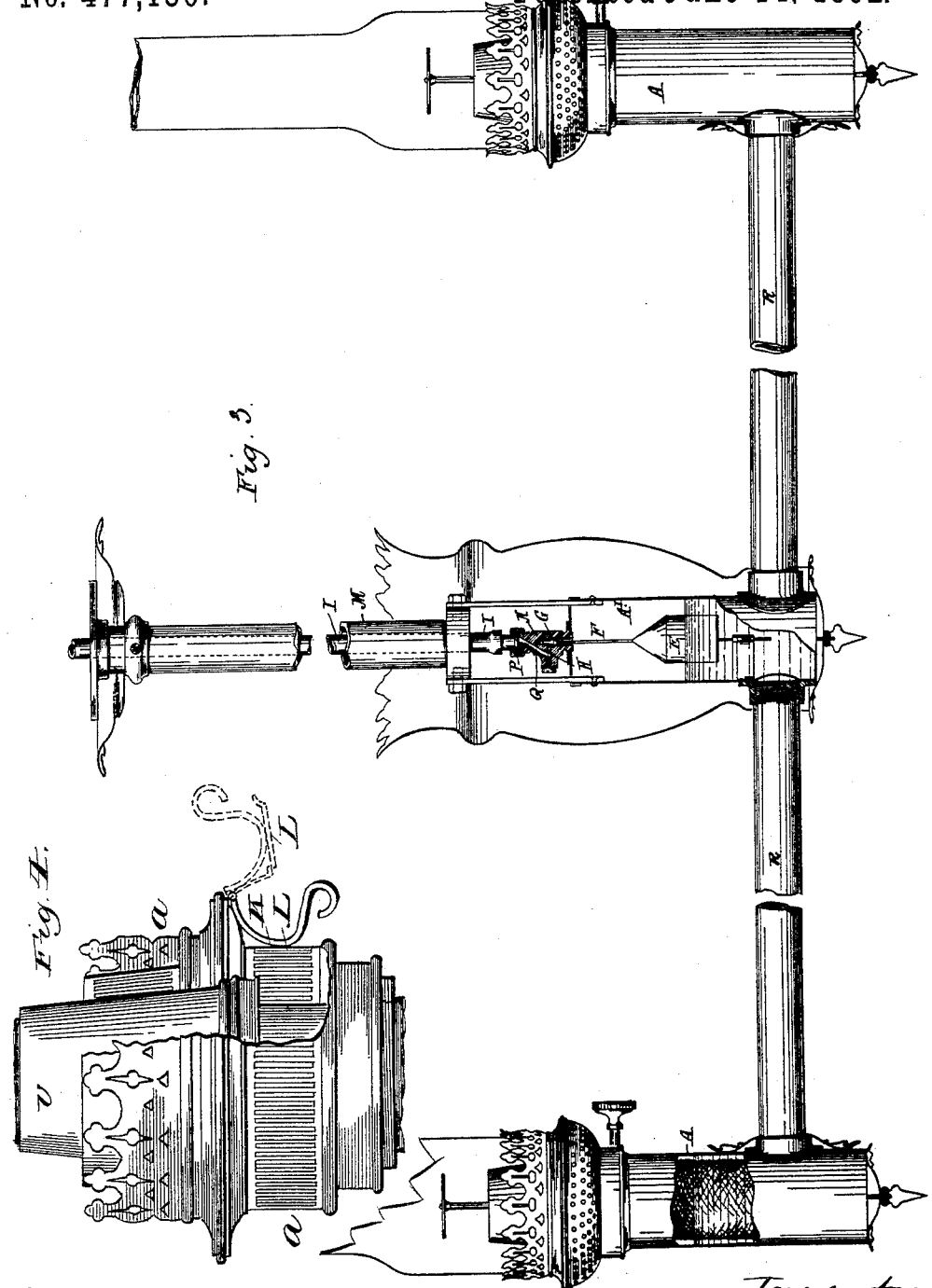

(No Model.) 6 Sheets—Sheet 4.
T. & A. E. PENN.
DEVICE FOR CONTROLLING THE DISTRIBUTION OF OILS TO LAMPS AND MEANS OF LIGHTING AND EXTINGUISHING THE SAME.

No. 477,150. Patented June 14, 1892.

(No Model.) 6 Sheets—Sheet 5.

T. & A. E. PENN.
DEVICE FOR CONTROLLING THE DISTRIBUTION OF OILS TO LAMPS AND MEANS OF LIGHTING AND EXTINGUISHING THE SAME.

No. 477,150. Patented June 14, 1892.

Witnesses:
Inventors:

(No Model.) 6 Sheets—Sheet 6.
T. & A. E. PENN.
DEVICE FOR CONTROLLING THE DISTRIBUTION OF OILS TO LAMPS
AND MEANS OF LIGHTING AND EXTINGUISHING THE SAME.
No. 477,150. Patented June 14, 1892.
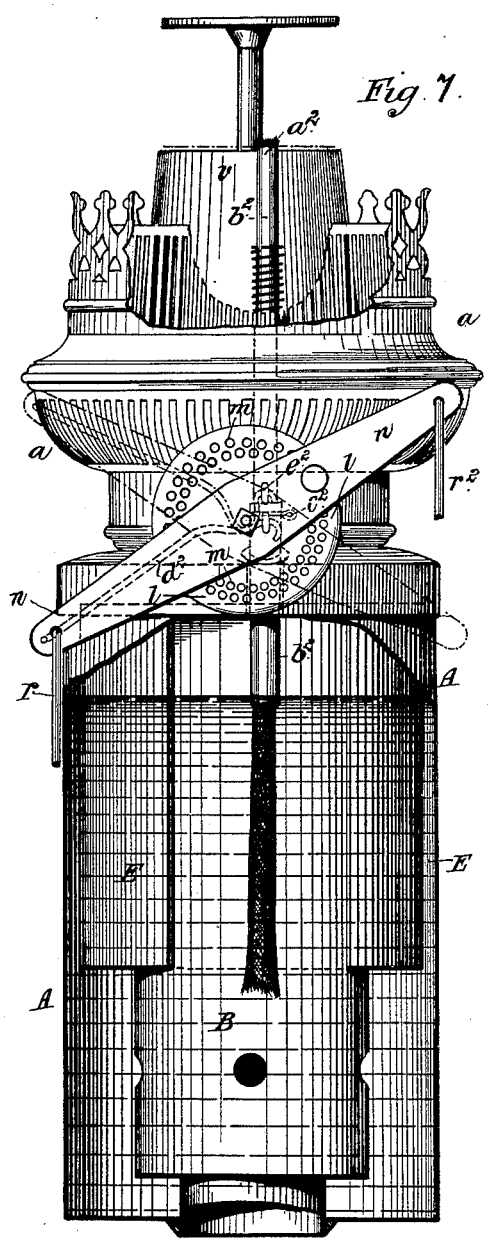

United States Patent Office.

THOMAS PENN AND ALFRED EDWARD PENN, OF LONDON, ASSIGNORS TO THE PENN LAMP AND LIGHTING COMPANY, LIMITED, OF ABCHURCH, ENGLAND.

DEVICE FOR CONTROLLING THE DISTRIBUTION OF OILS TO LAMPS AND MEANS FOR LIGHTING AND EXTINGUISHING THE SAME.

SPECIFICATION forming part of Letters Patent No. 477,150, dated June 14, 1892.

Application filed February 26, 1890. Serial No. 341,900. (No model.) Patented in England May 21, 1889, No. 8,389.

*To all whom it may concern:*

Be it known that we, THOMAS PENN and ALFRED EDWARD PENN, engineers, subjects of the Queen of Great Britain and Ireland, both residing at 40 Westbury Street, Wandsworth Road, London, in the county of Surrey, England, have invented certain new or Improved Devices for Controlling the Distribution of Oils to Lamps and Means for Lighting and Extinguishing the Same, (for which we have applied for a patent in Great Britain, No. 8,389, dated May 21, 1889,) of which the following is a specification.

This invention relates to certain new and useful improvements in lamps; and it consists, substantially, in such features of arrangement, construction, and combinations of parts as will hereinafter be more particularly described, and definitely pointed out in the claims.

The object of the invention is to provide safe and efficient means for supplying hydrocarbon or other oils to lamps at a uniform pressure at whatever height the oil-supply reservoir may be situated above the lamps.

It also has for its object to provide in connection therewith convenient means whereby lamps may be readily lighted and extinguished at a distance from the burners and without removing the chimneys or shades when such are used.

In order that our said invention may be fully understood, we shall now proceed more particularly to describe the same, and for that purpose shall refer to the several figures on the annexed sheets of drawings, the same letters of reference indicating corresponding parts in all the figures.

Figure 2:
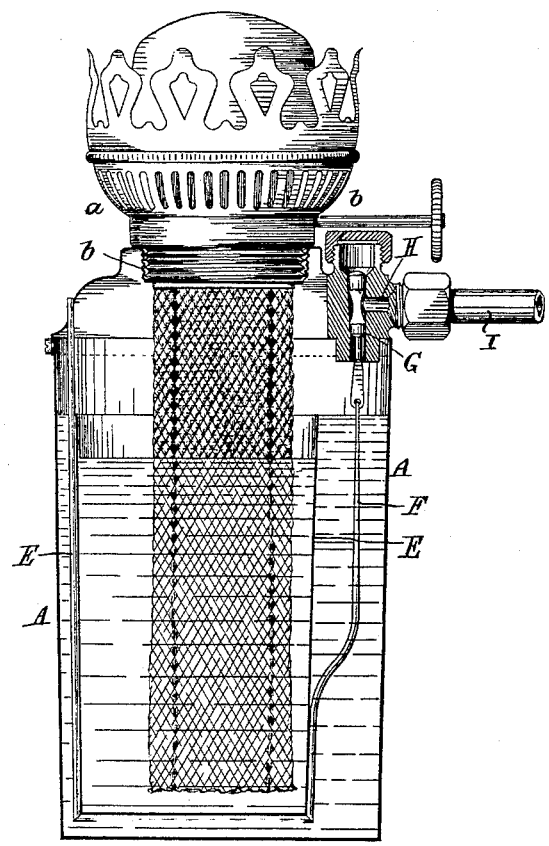
Figure 5:
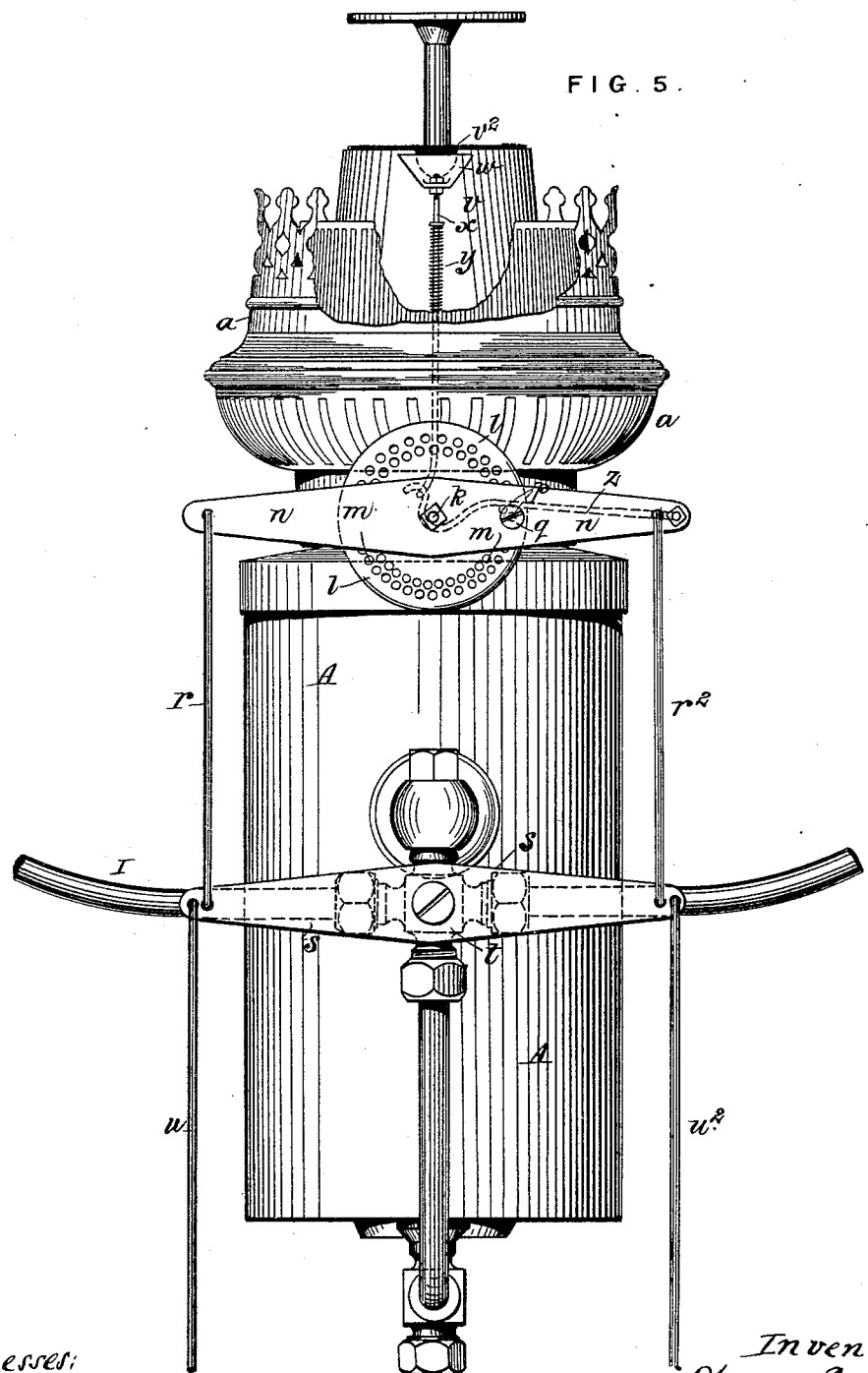
Figure 6:
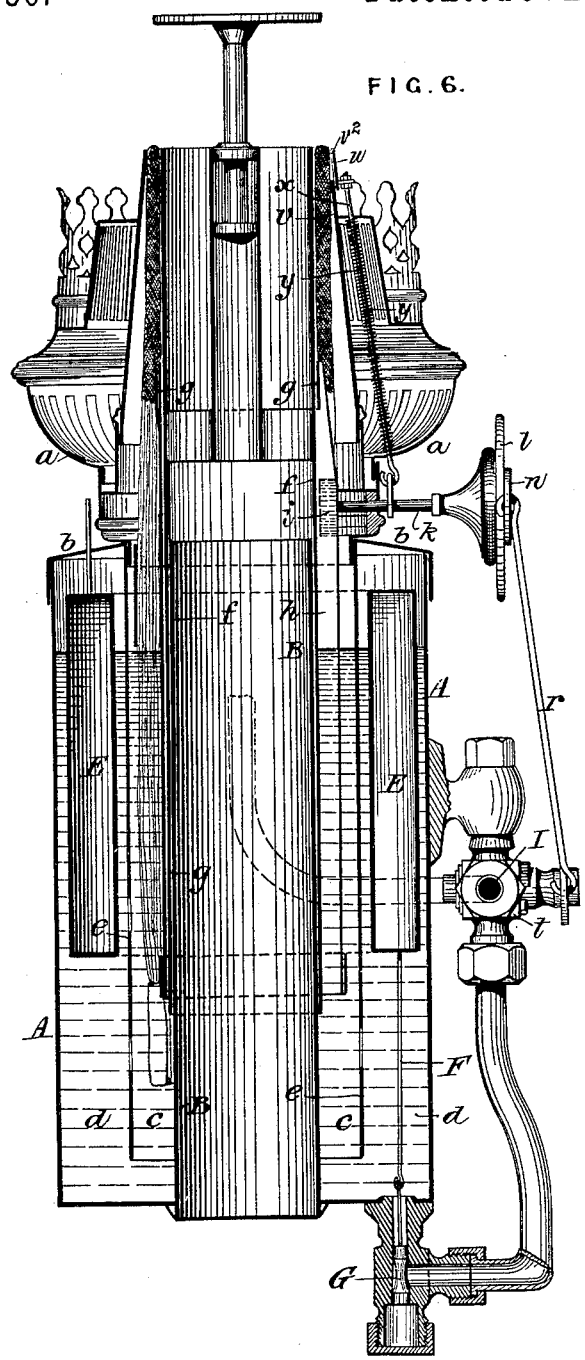

Figure 1 is a vertical section of a lamp suitable for use as a street-lamp, having a round or Argand wick burner and being provided with an oil-supply-governing device according to our invention, arranged at the side of the burner. Fig. 2 is a section of a lamp having a flat wick, the wick-chamber or vessel into which the wick dips forming part of the oil-supply-governing device. Fig. 3 shows the application of our improved oil-supply-governing device to a two-light pendant. Fig. 4 is an elevation of a lamp-burner, partly in section, illustrating means whereby the lamp may be lighted without removing the chimney or shade. Fig. 5 is an elevation, and Fig. 6 a vertical section, of a lamp, illustrating another arrangement of the oil-supply-governing device, and also means according to our invention for adjusting the height of the lamp-wick and for lighting the lamp from a distance from the burner. Fig. 7 is a view similar to Fig. 6, illustrating an arrangement for lighting the lamp by means of a small permanently-lighted jet.

Referring to Fig. 1, A is the lamp-fount or chamber into which the lamp-wick dips. This chamber is of annular form, and the burner $a$ (which is round) is screwed or otherwise fitted into or onto the top thereof. The central passage B through this lamp-fount corresponds with and forms a continuation of the central passage through the burner through which air passes to support combustion, and through which passages an instrument may be passed from below for the purpose of lighting the lamp. Attached to the side of the fount A and communicating therewith by a passage C is a small chamber D, preferably of a cylindrical form, in which is a float E. This float is connected by a stem or rod F to a valve G, which may be cylindrical, but is preferably of a conical shape, as shown, to facilitate its action. This valve is fitted to work in a conical seat in the bottom of the chamber D or in a box or case attached to the said bottom. Through the side of the valve box or seating is a passage H, with which is connected a pipe I, communicating with the main oil-supply reservoir, (not shown in the drawings,) situated in any desired or convenient position above the level of the lamp-burner to be supplied with oil. Oil admitted by the valve G to the chamber D passes through the passage C into the chamber A, and as it accumulates in the said chambers the float E rises and carries with it the valve G until the latter closes the passage H, and thereby cuts off the supply of oil to the chamber D. K is a by-pass in the valve-seating to admit of oil from the chamber D passing to and from beneath the valve G, so as not to interfere with its proper action. When the lamp is burning, the level of the oil in the chambers A and D will, owing to the consumption of oil at the burner, lower and cause the float E and valve G also to descend, the latter thereby opening the passage H in the valve-seat and admitting more oil to the chambers, so that as fast as the oil is consumed at the burner fresh oil is admitted to take the place thereof, and thus the normal level of the oil in the chambers A and D is constantly maintained as long as there is oil in the main reservoir, while, owing to the position of the passage H in the valve-seat with reference to the valve G, the pressure of the oil at the burner is always the same, regardless of the position of the oil-supply reservoir.

In the arrangement illustrated by Fig. 2 the float consists of a vessel E, open at top, into which vessel the lamp-wick dips. This float or vessel is placed in an outer vessel A, constituting the lamp-fount, the burner $a$ being screwed into a fitting $b$, attached to the upper end of the said fount by screws or otherwise. The fitting $b$ is provided with the seat for the valve G, which valve is connected by the rod F to the inner vessel or float E. The pipe I communicates with the interior of the outer vessel A by the passage H in the side of the valve-seat, as in the arrangement Fig. 1, and when the float descends, so as to cause the valve to uncover this passage, the oil will enter the outer vessel A and flow thence over the upper edge of the inner vessel E until this vessel becomes sufficiently heavy to descend and carry with it the valve G, so as to close the passage H, and thus cut off the supply of oil from the reservoir. When the lamp is in use, the oil consumed at the burner is drawn from the inner vessel E, into which vessel the lamp-wick dips, and consequently the weight of the said vessel decreases as the consumption proceeds until the vessel rises, and with it the valve G, so as to open the passage H to admit more oil to take the place of that consumed. The oil thus admitted enters the vessel E, thereby increasing its weight and causing it and the valve G to again descend, so as to close the passage H. Thus as fast as the oil is consumed at the burner fresh oil is admitted to the vessel to take its place, whereby the level of the oil in the vessels is constantly maintained uniform, or approximately so.

In applying our oil-supply-governing device to pendants having several burners one regulating device only is required for each pendant, the said device being arranged at the junction where the tubes leading to the various burners on the pendant meet.

Fig. 3 shows a two-light pendant as an example, from which it will be readily seen how the invention may be applied to a pendent bracket or the like having any other number of burners. I is the supply-pipe leading from the oil-reservoir and passing down the interior of vertical stem M of the pendant. At the lower end of the stem M there is connected a vessel A' A', containing a float E, attached by a rod F to a valve G, working in a valve seat or box N, arranged on top of the vessel A' A' and connected to the oil-supply pipe I by a union-coupling at P. From the pipe I the oil is conducted by a passage Q to the passage H, arranged in the valve box or seat at right angles to the line of motion of the valve G. Oil admitted by the valve G into the vessel A' A' passes through by the valve G into the tubes R, forming the horizontal arms of the pendant, to the lamp-cylinders or vessels A, into which the lamp-wicks dip. The level of the oil in the vessels A is always the same as that in the vessel A' A', and when by the consumption of oil at the burners the level of the oil descends the valve G will also descend with it and open the passage H in the valve-seat, so as to admit more oil from the reservoir into the vessel A' A' to restore it to its normal level, as in the arrangements hereinbefore described. The vessel A' A' and valve-box N and also the lamp-cylinders or vessels A may, if desired, be inclosed in ornamental casings. The lamps hereinbefore described may be mounted on brackets or on or in other suitable supports or holders, parts of which may be made hollow and serve as conductors of the oil from the main reservoir to the lamp-cylinders or vessels into which the lamp-wicks dip.

To permit of a lamp being lighted without removing the chimney or shade, a portion of the perforated part of the burner-casing may be cut away, as shown at K, Fig. 4, so as to provide an opening which will admit of a lighted taper or other lighting-instrument being passed therethrough to light the wick. This opening may be closed when not required to be used by a hinged piece L, which may be provided with a spring-fastening to retain it in its closed position. This arrangement may be used in any lamps that will not permit of a passage being formed through the center for the introduction of a lighting-instrument.

Figs. 5, 6, and 7 illustrate, respectively, means for elevating and lowering the auxiliary lighting-wick, means for raising or lowering the main wick, and means for effecting the operation of these parts without removal of the burner or chimney. A is the lamp-fount, to the bottom of which is secured a tube B, forming a central passage for air to the burner and through which an instrument may be passed for lighting the wick. The annular chamber surrounding the tube B is divided into two annular compartments $c$ and $d$ by a perforated tube $e$, connected to the top of the cylinder A by a mount or fitting $b$. In the inner annular compartment $c$ the lamp-wick dips, and in the outer compartment $d$ is placed an annular float E, connected by a rod F to the conical valve G, which is constructed and operates in like manner to that hereinbefore described with reference to Figs. 1 and 2. The burner $a$ is screwed into the fitting $b$, the inner tube $f$ of the burner fitting onto the central tube or passage B. The wick-carrier $g$ is fitted to slide on the inner tube $f$ of the burner and is provided with a rack $h$, with which gears a pinion $i$, fast on the wick-elevator spindle $k$, so that by turning the spindle $k$ the wick may be raised and lowered, as required. In order to operate the wick-elevator at a distance from the burner, (for example, when the lamp is fitted in an elevated position, such as on the top of a street-lamp post,) we provide on the spindle $k$ of the wick-elevator a disk $l$, having near its periphery a series of holes $m$, and on the same spindle we also mount so as to be capable of being turned thereon a lever $n$, provided at $p$ with a hole or with holes situated at a distance from the spindle $k$ corresponding to the positions of the holes $m$ in the disk $l$. In starting the lamp the wick is adjusted to the required height to last a certain length of time without requiring to be trimmed or readjusted, and the lever $n$ is then connected to the disk $l$ by means of a pin or screw $q$, passed through one of the holes at $p$ in the lever $n$ and screwed into one of the holes $m$ in the disk $l$. To each end of the lever $n$ is connected a cord, chain, or rod $r$ $r^2$, which may extend below to a convenient distance from the floor or ground to be within reach, so that by pulling one or other of the cords, chains, or rods $r$ $r^2$ motion of partial rotation will be imparted through the lever $n$ to the disk $l$, and thereby raise or lower the wick, as required, to light or extinguish the lamp. Instead of the rods $r$ $r^2$ extending directly to within reach from the floor or ground, as described, they may be connected to a similar lever $s$, as shown in Fig. 5, fast on the plug of a cock $t$ on the pipe I, through which oil is conducted from the main reservoir to the valve G. To the outer ends of this lever are attached chains, cords, or rods $u$ $u^2$, extending to within reach from the ground. By this arrangement when one of the chains or the like $u$ $u^2$ is pulled, so as to elevate the wick for the purpose of lighting it, the cock $t$ will be at the same time turned, so as to open communication between the main oil-reservoir and the lamp. The lamp may be lighted from below by means of any suitable lighting-instrument passed up the tube or passage B or otherwise.

In the drawings we have shown means whereby a portion of the wick may be kept lighted after the main part has been extinguished. For this purpose a portion of the exterior wick-tube $v$ is cut away, as shown at $v^2$, which cut-away part is covered when the lamp is burning by a piece $w$, carried on a rod $x$ and kept in position by a spring $y$. The lower end of the rod $x$ is connected to a rod $z$, attached to the lever $n$ in such a manner that when the lever is moved so as to lower the wick for the purpose of extinguishing the lamp the piece $w$ will also be lowered and uncover the opening $v^2$. The portion of the wick situated at the opening $v$ will therefore remain lighted ready to ignite the rest of the wick when it is again turned up for the purpose. When the wick is raised, the piece $w$ rises with it and covers the opening $v^2$, that the flame may be uniform. Instead of retaining a portion of the main wick lighted, as described, a small auxiliary jet may be provided, as shown at $a^2$ in Fig. 7, which jet may remain lighted after the main wick has been extinguished and caused to again ignite the said main wick when required. This auxiliary jet consists of a small wick contained in a tube $b^2$, fitted so as to slide in a socket in the top of the fount A of the lamp and preferably made in two parts connected together by a pin $c^2$ to admit of their being readily separated when the burner is required to be removed from its holder. The wick passes through the tube $b^2$ into the oil contained in the fount A. This jet $a^2$ is raised and lowered by means of a connection $d^2$, one end of which is attached to an eye $e^2$ on the tube $b^2$ and the other end to the lever $n$, which operates the main-wick elevator. When the main wick is being raised by means of the lever $n$, the auxiliary jet (which is lighted) is caused to descend, and in passing the main wick ignites the said wick. When the main wick is extinguished by turning it down into the wick-tube, the auxiliary jet $a^2$ is simultaneously raised above the wick-tube ready to again light the main wick when it is again elevated.

By means of our improved supply-controlling device hereinbefore described petroleum and other oils may be distributed with safety through pipes from a reservoir to various places over a large area in a similar manner to that in which gas is at present distributed.

Having now particularly described our said invention, what we claim is—

1. In a lamp of the character referred to, the combination of the oil-fount having a side passage therein, a chamber having a passage communicating with said side passage, a float located in said chamber, a valve beneath the chamber and connected to the float, and a seat in which said valve works, said seat having a supply-passage arranged at an angle to the line of motion of the valve, substantially as shown, and for the purpose described.

2. In a lamp of the character described, the combination of the oil-fount having a side passage therein, a chamber having a passage communicating with said side passage, a float located in said chamber, a valve beneath the chamber and connected to the float, and a seat within which said valve works, said seat having a supply-passage arranged at an angle to the line of motion of the valve and a by-pass communicating at one end with the float-chamber and at the other end with the valve-seat beneath the valve, substantially as set forth.

3. The combination, with the pipe I, having a cock $t$, and the movable lever on the wick-raising spindle, of the additional lever secured to the plug of said cock, connections between the two levers, and means for operating said levers, whereby the wick is raised or lowered and the oil-supply opened or cut off, substantially as described.

4. In a lamp of the character described, the combination of the oil-fount having a side passage therein, a chamber having a passage communicating with said side passage, a float located in said chamber, a valve located beneath the chamber and connected to the float, and a seat within which said valve works, said seat having an oil-supply passage and a by-pass communicating at one end with the float-chamber and at the other end with the valve-seat beneath the valve, substantially as set forth.

In testimony whereof we have signed our names to this specification in the presence of two subscribing witnesses.

THOMAS PENN.
ALFRED EDWARD PENN.

Witnesses:
CHAS. MILLS,
EDWD. GEO. DAVIES,
*Both of 47 Lincoln's Inn Fields, London.*